US012733573B2

(12) United States Patent
Noll et al.

(10) Patent No.: US 12,733,573 B2
(45) Date of Patent: Sep. 15, 2026

(54) FRAME ASSEMBLY FOR AN AGRICULTURAL IMPLEMENT

(71) Applicant: CNH Industrial America LLC, New Holland, PA (US)

(72) Inventors: Blaine R. Noll, Fleetwood, PA (US); Jeffrey D. Thomas, Gordonville, PA (US); Benjamin D. Kemmerer, Hamburg, PA (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 536 days.

(21) Appl. No.: 18/120,870

(22) Filed: Mar. 13, 2023

(65) Prior Publication Data

US 2024/0306535 A1 Sep. 19, 2024

(51) Int. Cl.
*A01D 34/28* (2006.01)
*A01D 34/04* (2006.01)

(52) U.S. Cl.
CPC ........... *A01D 34/283* (2013.01); *A01D 34/04* (2013.01)

(58) Field of Classification Search
CPC ...... A01D 34/283; A01D 34/04; A01D 41/14; A01D 41/00; A01D 41/06
See application file for complete search history.

(56) References Cited

U.S. PATENT DOCUMENTS 2,947,134 A 8/1960 Clifford et al.
3,304,699 A 2/1967 Koch et al.
3,363,407 A * 1/1968 Drummond ............ A01D 57/00 56/15.8
3,959,957 A 6/1976 Halls
4,266,395 A 5/1981 Basham
4,527,381 A 7/1985 Mann
4,622,805 A 11/1986 Johnson et al.
4,724,661 A 2/1988 Blakeslee et al.
(Continued)

FOREIGN PATENT DOCUMENTS

AU 2019202982 7/2020
CA 3033127 8/2019
(Continued)

OTHER PUBLICATIONS

U.S. Appl. No. 18/120,884, filed Mar. 13, 2023, Noll.
(Continued)

*Primary Examiner* — Brad Harcourt
(74) *Attorney, Agent, or Firm* — Fletcher Yoder, P.C.

(57) ABSTRACT

A frame assembly for an agricultural header includes an intermediate frame and arms coupled to the intermediate frame. Each arm is configured to couple to a frame of the agricultural header at a respective joint and rotate relative to the frame of the agricultural header at the respective joint. Each respective joint is disposed on an axis extending through pivot joints of the agricultural header. The pivot joints pivotally couple header arms to the frame of the agricultural header, and the header arms are configured to support a cutter bar of the agricultural header. The frame assembly also includes springs coupled to the intermediate frame. Each spring is coupled to a respective arm of the arms, and the springs are configured to flex to enable movement of the frame of the agricultural header relative to the intermediate frame.

20 Claims, 6 Drawing Sheets

(56) References Cited

U.S. PATENT DOCUMENTS

| | | | |
|---|---|---|---|
| 4,956,966 A | 9/1990 | Patterson | |
| 5,341,628 A | 8/1994 | Schumacher et al. | |
| RE35,543 E | 7/1997 | Patterson | |
| 7,520,115 B2 | 4/2009 | Coers et al. | |
| 7,650,736 B1 | 1/2010 | Salley et al. | |
| 9,526,206 B2 | 12/2016 | Schulze Rückamp et al. | |
| 10,159,182 B2 | 12/2018 | Berggren | |
| 10,433,486 B2 | 10/2019 | Vandeven et al. | |
| 10,568,266 B2 | 2/2020 | Vandeven et al. | |
| 10,575,467 B2 | 3/2020 | Fuechtling et al. | |
| 11,273,990 B2 | 3/2022 | Cook | |
| 11,758,840 B2 | 9/2023 | Farley et al. | |
| 2008/0161077 A1 | 7/2008 | Honey | |
| 2008/0295474 A1 | 12/2008 | Tippery | |
| 2013/0097986 A1 | 4/2013 | Lovett et al. | |
| 2016/0345498 A1* | 12/2016 | De Lathauwer | A01D 67/005 |
| 2017/0013778 A1 | 1/2017 | Borry et al. | |
| 2018/0303029 A1 | 10/2018 | Wilbert et al. | |
| 2018/0310457 A1 | 11/2018 | Brimeyer et al. | |
| 2018/0310462 A1 | 11/2018 | Chen et al. | |
| 2018/0310472 A1 | 11/2018 | Vandeven et al. | |
| 2018/0310476 A1 | 11/2018 | Brimeyer et al. | |
| 2019/0104682 A1 | 4/2019 | Mossman | |
| 2019/0230857 A1 | 8/2019 | Thomson | |
| 2020/0022304 A1 | 1/2020 | Mossman | |
| 2021/0112713 A1* | 4/2021 | Martin | A01B 63/002 |
| 2021/0120734 A1* | 4/2021 | Reubens | A01D 34/13 |
| 2021/0127579 A1 | 5/2021 | White et al. | |
| 2021/0163229 A1 | 6/2021 | Cook | |
| 2021/0185918 A1 | 6/2021 | Hunt et al. | |
| 2022/0400615 A1 | 12/2022 | Franke et al. | |
| 2023/0172110 A1 | 6/2023 | Sudhues et al. | |
| 2024/0306535 A1 | 9/2024 | Noll et al. | |
| 2024/0306543 A1 | 9/2024 | Noll et al. | |

FOREIGN PATENT DOCUMENTS

| | | |
|---|---|---|
| CN | 102065676 | 5/2011 |
| CN | 102083301 | 6/2011 |
| CN | 106797750 | 6/2017 |
| EP | 2420127 B1 | 6/2017 |
| EP | 3417694 | 12/2018 |
| GB | 1348828 A | 3/1974 |
| WO | 2021216791 | 10/2021 |

OTHER PUBLICATIONS

U.S. Appl. No. 18/120,901, filed Mar. 13, 2023, Noll.

U.S. Appl. No. 18/120,915, filed Mar. 13, 2023, DeChristopher.

U.S. Appl. No. 18/120,901, Non-Final Office Action mailed Sep. 24, 2025, 28 pgs.

U.S. Appl. No. 18/120,884, Non-Final Office Action mailed Sep. 17, 2025, 22 pgs.

U.S. Appl. No. 18/120,901, Notice of Allowance mailed Feb. 18, 2026, 5 pgs.

U.S. Appl. No. 18/120,884, Notice of Allowance mailed Feb. 18, 2026, 5 pgs.

U.S. Appl. No. 18/120,915, Notice of Allowance mailed Jan. 27, 2026, 5 pgs.

U.S. Appl. No. 18/120,915, Non-Final Office Action mailed Aug. 22, 2025, 14 pgs.

* cited by examiner

FRAME ASSEMBLY FOR AN AGRICULTURAL IMPLEMENT

BACKGROUND

The present disclosure relates generally to a frame assembly for an agricultural implement.

A harvester may be used to harvest agricultural crops, such as barley, beans, beets, carrots, corn, cotton, flax, oats, potatoes, rye, soybeans, wheat, or other plant crops. Furthermore, a combine (e.g., combine harvester) is a type of harvester generally used to harvest certain agricultural crops that include grain (e.g., barley, corn, flax, oats, rye, wheat). During operation of the harvester, the harvesting process may begin by removing a plant from a field, such as by using a header. The header may cut the agricultural crops and transport the cut agricultural crops to a processing system of the harvester. The header may include a cutter bar assembly configured to cut a portion of each agricultural crop (e.g., a stalk), thereby separating the cut agricultural crop from the soil. The cutter bar assembly may extend along a substantial portion of a width of the header at a forward end of the header.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, a frame assembly for an agricultural header includes an intermediate frame and arms coupled to the intermediate frame. Each arm is configured to couple to a frame of the agricultural header at a respective joint and rotate relative to the frame of the agricultural header at the respective joint. Each respective joint is disposed on an axis extending through pivot joints of the agricultural header. The pivot joints pivotally couple header arms to the frame of the agricultural header, and the header arms are configured to support a cutter bar of the agricultural header. The frame assembly also includes springs coupled to the intermediate frame. Each spring is coupled to a respective arm of the arms, and the springs are configured to flex to enable movement of the frame of the agricultural header relative to the intermediate frame.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
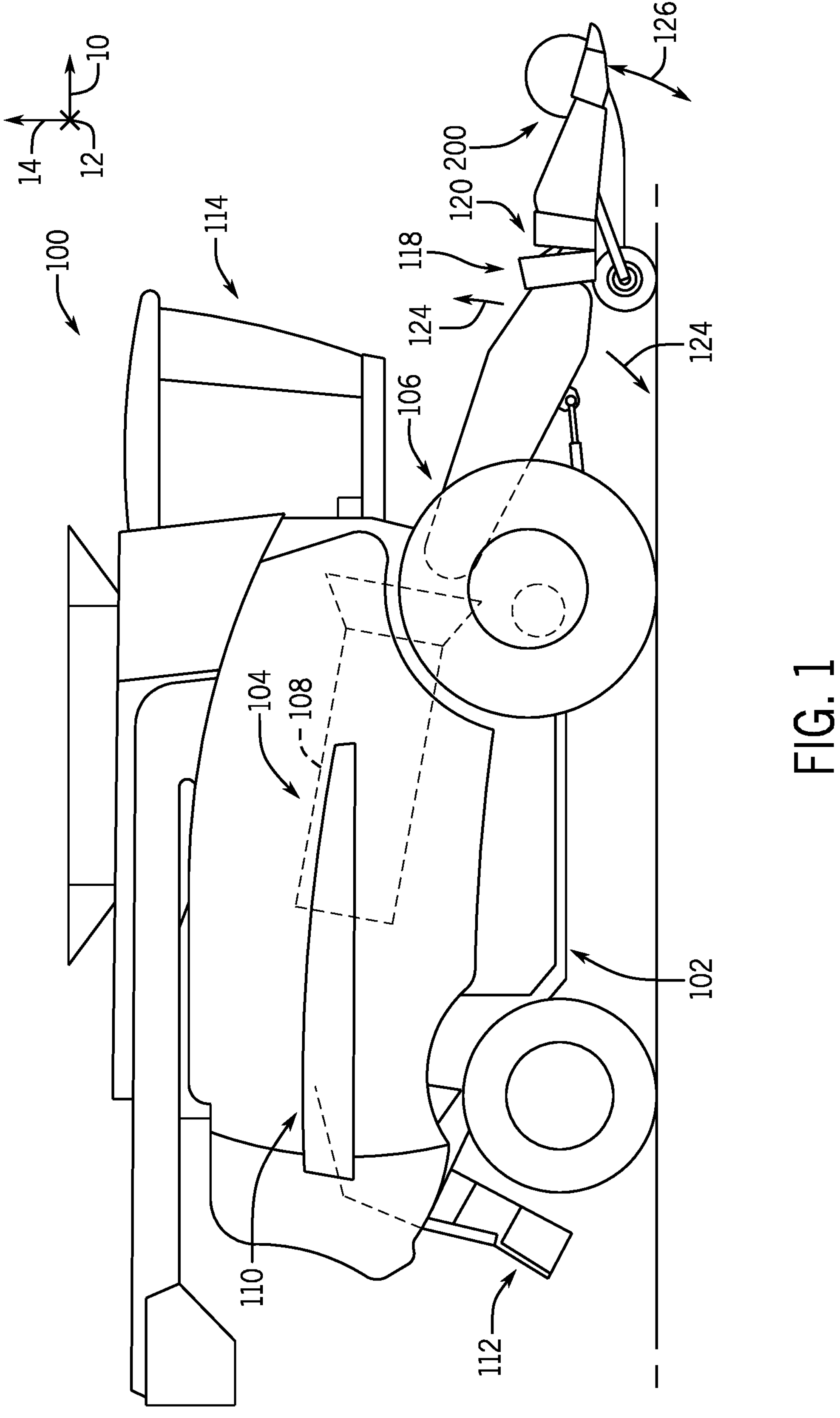
FIG. 1 is a side view of an embodiment of an agricultural harvester, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

An agricultural harvester may include a header having a cutter bar assembly. The cutter bar assembly may include a cutter bar, a stationary blade assembly, and a moving blade assembly. The moving blade assembly may be fixed to the cutter bar, and the cutter bar/moving blade assembly may be driven to oscillate relative to the stationary blade assembly. Each blade assembly may include multiple blades distributed along a width of the respective blade assembly. As the moving blade assembly is driven to oscillate, the blades of the moving blade assembly move relative to the blades of the stationary blade assembly. As the header is moved through the field by the agricultural harvester, a portion of a crop (e.g., the stalk) may enter a gap between adjacent blades of the stationary blade assembly and a gap between adjacent blades of the moving blade assembly. Movement of the moving blade assembly causes a blade of the moving blade assembly to move across the gap in the stationary blade assembly, thereby cutting the portion of the crop. The header may include belts that move the cut crops toward an inlet of an agricultural crop processing system. In some embodiments, the header may include a reel assembly that directs the portion of the crop toward the cutter bar assembly and/or directs the cut crops from the cutter bar assembly toward the belts.

The cutter bar assembly may be flexible along a width of the header. In such cases, the cutter bar assembly may be supported by multiple longitudinally-extending arms distributed along the width of the header. Each arm may be pivotally mounted to a header frame of the header, thereby enabling the cutter bar assembly to flex during operation of the agricultural harvester. While the flexible cutter bar assembly is in contact with the soil surface, the flexible cutter bar assembly may follow the contours of the field, thereby enabling a cutting height to be substantially constant along the width of the header. If a greater cutting height is desired (e.g., based on the field conditions, the types of crops being harvested, etc.), the header may be raised such that the flexible cutter bar assembly is positioned above the soil surface. In addition, if a substantially rigid cutter bar is desired (e.g., for certain field conditions, for harvesting certain types of crops, etc.), the pivoting movement of each arm may be blocked, thereby substantially reducing the flexibility of the cutter bar assembly.

It is now recognized that the cutter bar assembly may not respond to changes in contours of the field quickly enough to cut crops at the desired cutting height, such as while operating at higher ground speeds or while operating on uneven terrain. For example, a header height control system may not respond quickly enough while traversing the uneven terrain to cut crops at the desired cutting height, which may result in uneven (e.g., wavy) crop stubble. Additionally, movement of portions of the header relative to one another and/or movement of the header relative to an implement interface of an agricultural vehicle in response to the changing contour of the terrain may cause stress at portions of the header and/or at the implement interface. This stress may increase wear and maintenance of the header and the agricultural vehicle. Further, in embodiments with a rigid cutter bar assembly, raising a side of the cutter bar assembly, such as due to encountering an obstacle at the side, may raise other portion(s) of the cutter bar assembly (e.g., a central portion of the cutter assembly, an opposite side of the cutter bar assembly relative to the raised side) or the entire cutter bar assembly to an undesired cutting height. Accordingly, the embodiments described herein provide an intermediate frame assembly that facilitates movement of the header, thereby enabling the cutter bar assembly to follow terrain at a desired cutting height, such as while operating at higher ground speeds and/or on uneven terrain.

Turning to the drawings, FIG. 1 is a side view of an embodiment of an agricultural harvester 100 (e.g., an agricultural vehicle) having a header 200 (e.g., agricultural header). The agricultural harvester 100 includes a chassis 102 configured to support the header 200 and an agricultural crop processing system 104. To facilitate description of the agricultural harvester 100 and portions thereof, a longitudinal axis 10, a lateral axis 12, and a vertical axis 14 are provided in FIG. 1. In certain embodiments, the longitudinal axis 10, the lateral axis 12, the vertical axis 14, or a combination thereof, may be an axis or axes of the header 200. As described in greater detail below, the header 200 is configured to cut crops and to transport the cut crops toward an inlet 106 of the agricultural crop processing system 104 for further processing of the cut crops. For example, the header 200 may include a reel assembly configured to direct cut crops toward belts that convey the crops toward the inlet of the agricultural crop processing system 104. The agricultural crop processing system 104 receives the cut crops from the header 200 and separates desired crop material (e.g., grain) from crop residue (e.g., husks and pods). For example, the agricultural crop processing system 104 may include a thresher 108 having a cylindrical threshing rotor that transports the cut crops in a helical flow path through the agricultural harvester 100. In addition to transporting the cut crops, the thresher 108 may separate the desired crop material from the crop residue and may enable the desired crop material to flow into a cleaning system located beneath the thresher 108. The cleaning system may remove debris from the desired crop material and transport the desired crop material to a storage compartment within the agricultural harvester 100. The crop residue may be transported from the thresher 108 to a crop residue handling system 110, which may remove the crop residue from the agricultural harvester 100 via a crop residue spreading system 112 positioned at an aft end of the agricultural harvester 100.

As discussed in detail below, the header 200 includes a cutter bar assembly configured to cut the crops within the field. The cutter bar assembly is configured to flex along a width of the header to enable the cutter bar assembly to substantially follow the contours of the field while the cutter bar assembly is engaged with the soil surface. The cutter bar assembly is supported by multiple longitudinally extending arm assemblies distributed along the width of the header. Each arm assembly is pivotally mounted to a header frame of the header, thereby enabling the cutter bar assembly to flex. Additionally, each arm assembly may have a range of motion (e.g., float) relative to the frame. If a substantially rigid cutter bar is desired (e.g., for certain field conditions, for harvesting certain types of crops, etc.), the pivoting movement of each arm may be blocked, thereby substantially reducing the flexibility of the cutter bar assembly.

Additionally, the agricultural harvester 100 includes an implement interface 118 and an intermediate frame assembly 120 (e.g., a frame assembly) coupled to the implement interface 118 and the header 200. The implement interface 118 may include a frame of the agricultural harvester 100 and/or may be a portion of the chassis 102. In certain embodiments, the implement interface 118 may be coupled to and extend from the chassis 102. In certain embodiments, the implement interface 118 may be a combine feeder. In some embodiments, the implement interface 118 may move generally vertically, as indicated by arrows 124, to adjust a position of the header 200 (e.g., to adjust to an operating position or a travel position, to adjust a height of the header 200). For example, the implement interface 118 may move generally along the vertical axis 14 to adjust a position of the header 200 relative to the harvester chassis 102 and/or to adjust a height of the header 200 relative to a ground level. In certain embodiments, the intermediate frame assembly may be coupled to agricultural implements other than a header, such as fertilizing implement, a tilling implement, or another suitable agricultural implement.

The intermediate frame assembly 120 is configured to enable the header 200 to move vertically relative to the implement interface 118. As described in greater detail below, lateral sides of the header 200 are configured to move generally vertically, as indicated by arrows 126. For example, a first lateral side of the header 200 may encounter an obstacle (e.g., a dirt mound, a hill, a rock, crop stubble, crop residue, etc.), which may drive the first lateral side upwardly. The intermediate frame assembly 120 is configured to enable the first lateral side of the header 200 to move upwardly relative to a second, opposite lateral side of the header 200. Additionally, the first lateral side of the header 200 may encounter an obstacle such as a hole that may cause the first lateral side to move downwardly, and the intermediate frame assembly 120 may enable the first lateral side to move downwardly relative to the second lateral side of the header 200. As such, the intermediate frame assembly 120 may enable the header 200 to rotate about the longitudinal axis 10 (e.g., rotation of the first lateral side, the second lateral side, and/or a central frame portion of the header 200 positioned between the first lateral side and the second lateral side about the longitudinal axis 10). Accordingly, the intermediate frame assembly 120 may facilitate each of the lateral sides of the header 200, as well as portion(s) of the header 200 between the lateral sides, to follow the contour of terrain encountered by the header 200.

The intermediate frame assembly 120 is configured to provide for relative movement of the lateral sides of the header 200 while the cutter bar assembly is in both the flexible configuration and the substantially rigid configuration. For example, while in the flexible configuration, the cutter bar assembly is configured to substantially follow the contours of the field while the cutter bar assembly is engaged with the soil surface, and the intermediate frame assembly 120 is configured to further facilitate following the contours of the field. While in the substantially rigid configuration, the intermediate frame assembly 120 is configured to enable a lateral side of the header 200 to move vertically (e.g., upon encountering an obstacle or uneven terrain at the lateral side) relative to an opposite lateral side of the header 200, thereby enabling the opposite lateral side to substantially remain at a desired cutting height relative to the terrain.

Figure 2:
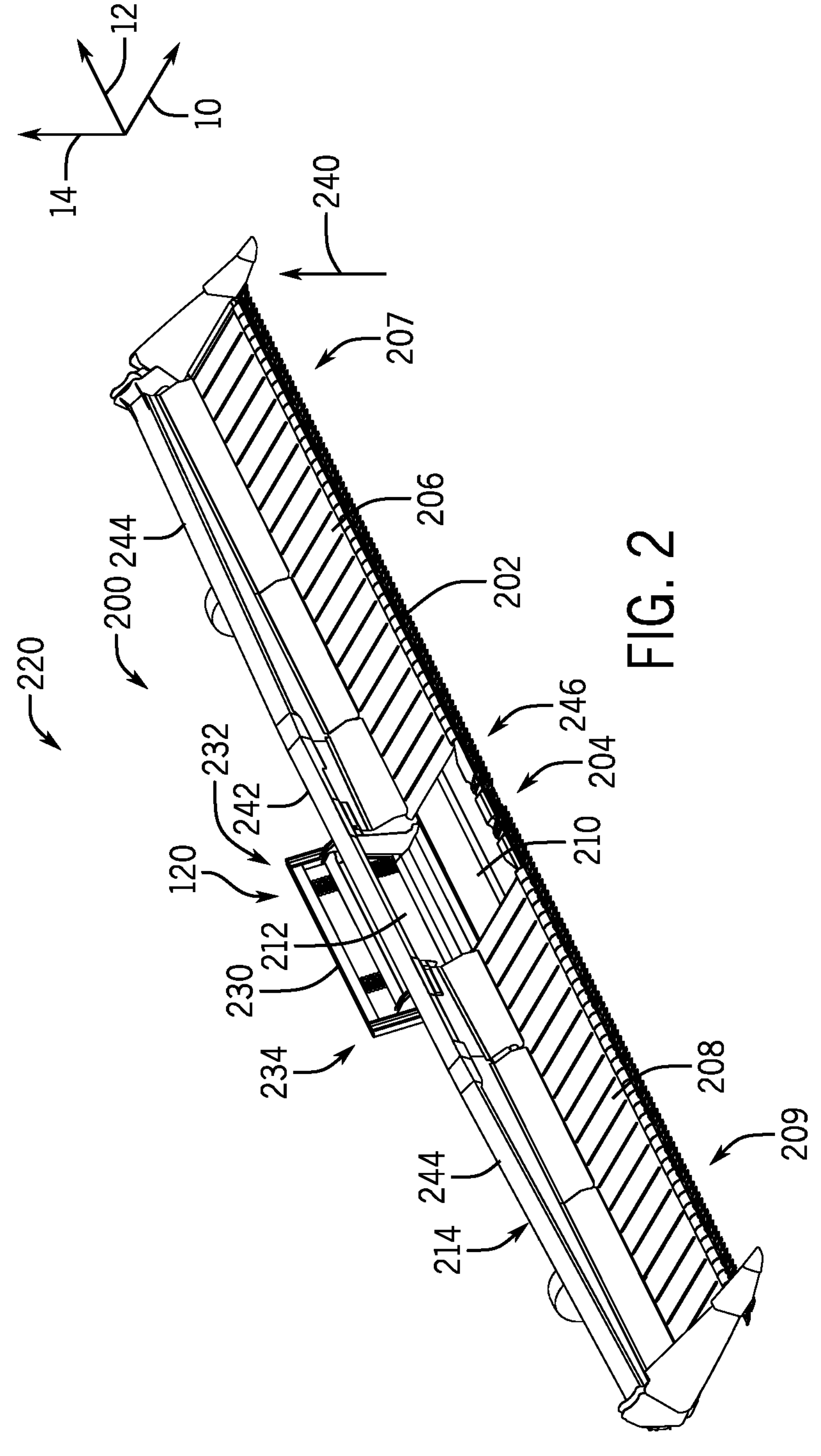
FIG. 2 is a front perspective view of an embodiment of a header and an intermediate frame assembly that may be employed within the agricultural harvester of FIG. 1, in accordance with an aspect of the present disclosure.

FIG. 2 is a perspective view of an embodiment of the header 200 that may be employed within the agricultural harvester of FIG. 1. In the illustrated embodiment, the header 200 includes a cutter bar assembly 202 configured to cut a portion of each crop (e.g., a stalk), thereby separating the crop from the soil. The cutter bar assembly 202 is positioned at a forward end of the header 200 along the longitudinal axis 10 and relative to a direction of travel of the header 200 during harvesting operations. As illustrated, the cutter bar assembly 202 extends along a substantial portion of the width of the header 200 (e.g., the extent of the header 200 along the lateral axis 12). The cutter bar assembly 202 includes a cutter bar, a stationary blade assembly, and a moving blade assembly. The moving blade assembly is coupled to the cutter bar (e.g., above the cutter bar along the vertical axis 14), and the cutter bar/moving blade assembly is driven to oscillate relative to the stationary blade assembly. In the illustrated embodiment, the cutter bar/moving blade assembly is driven to oscillate by a driving mechanism 204 positioned at the lateral center of the header 200. However, in other embodiments, the cutter bar/moving blade assembly may be driven by another suitable mechanism (e.g., located at any suitable position on the header). As the agricultural harvester is driven through a field, the cutter bar assembly 202 engages crops within the field, and the moving blade assembly cuts the crops (e.g., the stalks of the crops) in response to engagement of the cutter bar assembly 202 with the crops.

In the illustrated embodiment, the header 200 includes a first lateral belt 206 on a first lateral side 207 of the header 200 and a second lateral belt 208 on a second lateral side 209 of the header 200, opposite the first lateral side 207. Each belt is driven to rotate by a suitable drive mechanism, such as an electric motor or a hydraulic motor. The first lateral belt 206 and the second lateral belt 208 are driven such that the top surface of each belt moves laterally inward. In addition, the header 200 includes a longitudinal belt 210 positioned between the first lateral belt 206 and the second lateral belt 208 along the lateral axis 12. The longitudinal belt 210 is driven to rotate by a suitable drive mechanism, such as an electric motor or a hydraulic motor. The longitudinal belt 210 is driven such that the top surface of the longitudinal belt 210 moves rearwardly along the longitudinal axis 10. In certain embodiments, the crops cut by the cutter bar assembly 202 are directed toward the belts by a reel assembly. Agricultural crops that contact the top surface of the lateral belts 206, 208 are driven laterally inwardly to the longitudinal belt 210 due to the movement of the lateral belts 206, 208. In addition, agricultural crops that contact the longitudinal belt 210 and the agricultural crops provided to the longitudinal belt 210 by the lateral belts 206, 208 are driven rearwardly along the longitudinal axis 10 due to the movement of the longitudinal belt 210. Accordingly, the belts move the cut agricultural crops through an opening 212 in the header 200 to the inlet of the agricultural crop processing system. In certain embodiments, the header 200 may include an auger in the opening 212 that facilitates directing the cut crops into the agricultural crop processing system.

In the illustrated embodiment, the cutter bar assembly 202 is flexible along the width of the header 200 (e.g., the extent of the header 200 along the lateral axis 12). The cutter bar assembly 202 is supported by multiple arm assemblies extending along the longitudinal axis 10 and distributed along the width of the header 200 (e.g., along the lateral axis 12). Each arm assembly is mounted to a header frame 214 of the header 200 and configured to rotate about a pivot axis relative to the header frame 214. As a result, the cutter bar assembly 202 may flex during operation of the agricultural harvester. The flexible cutter bar assembly 202 may follow the contours of the field while the cutter bar assembly 202 is in contact with the surface of the field, thereby enabling the cutting height (e.g., the height at which each crop is cut) to be substantially constant along the width of the header 200 (e.g., the extent of the header 200 along the lateral axis 12). However, if a substantially rigid cutter bar assembly is desired (e.g., for certain field conditions, for harvesting certain types of crops, etc.), the pivoting movement of the arm assemblies may be blocked, thereby substantially reducing the flexibility of the cutter bar assembly 202.

Additionally, as described above, the intermediate frame assembly 120 may facilitate the cutter bar assembly 202 following contours of the field. In certain embodiments, an implement assembly 220 may include the intermediate frame assembly 120 and/or the header 200. The intermediate frame assembly 120 includes an intermediate frame 230, a first lateral side 232, and a second lateral side 234 opposite the first lateral side 232. As described in greater detail below, the first lateral side 232 and the second lateral side 234 of the intermediate frame assembly 120 are coupled to the first lateral side 207 and the second lateral side 209 of the header 200, respectively, via arms of the intermediate frame assembly 120 that enable the lateral sides 207 and 209 to move generally vertically (e.g., up and/or down) relative to one another, such as when one of the first lateral side 207 or the second lateral side 209 encounters an obstacle (e.g., a dirt mound, a hill, a hole, a rock, crop stubble, crop residue, etc.) or uneven terrain.

To facilitate description, the coupling between the intermediate frame assembly 120 and the header 200 is described in reference to the first lateral side 207 of the header 200 encountering an obstacle, such that the first lateral side 207 rises upwardly relative to the second lateral side 209 and/or other portion(s) of the header 200, as indicated by arrow 240. In addition, other portion(s) of the header 200 may also encounter obstacles and/or uneven terrain, such that the other portion(s) move generally vertically relative to other/different portion(s) of the header 200. The intermediate frame assembly 120 includes a first arm at the first lateral side 232, in which the first arm is pivotally coupled to the header frame 214 of the header 200 at the first lateral side 207. The intermediate frame assembly 120 also includes a second arm at the second lateral side 234, in which the second arm is pivotally coupled to the header frame 214 of the header 200 at the second lateral side 209. As the first lateral side 207 of the header 200 moves upwardly, as indicated by arrow 240, the first arm of the intermediate frame assembly 120 rotates relative to the intermediate frame 230 of the intermediate frame assembly 120 and the header frame 214 of the header 200. Additionally, a first spring coupled to the first lateral side 232 and to the rotating first arm flexes (e.g., contracts) in response to the first arm rotating. Further, the second arm of the intermediate frame assembly 120 is driven to rotate in response to movement of the first lateral side 207 of the header 200. For example, the second arm may rotate in an opposite rotational direction relative to the rotational direction of the first arm or may rotate in the same rotational direction to a lesser degree relative to the first arm. A second spring coupled to the rotating second arm and to the intermediate frame 230 at the second lateral side 234 flexes (e.g., extends or contracts) in response to the second arm rotating. Additionally, the coupling between the arms of the intermediate frame assembly 120 and the header frame 214 may include ball and slider joints configured to enable the header 200 to move laterally relative to the intermediate frame 230 of the intermediate frame assembly 120. As such, the intermediate frame assembly 120, via the first arm, the second arm, and the ball and slider joints, is configured to enable the first lateral side 207 and the second lateral side 209 of the header 200 to move generally vertically relative to one another and/or laterally relative to the intermediate frame 230. Accordingly, the intermediate frame assembly 120 may isolate movement of the header 200 (e.g., vertical movement, rotational movement) relative to the implement interface (e.g., the combine feeder) of the agricultural harvester. Example embodiments of the ball and slider joints are described below in reference to FIGS. 5-7.

In certain embodiments and as described below in reference to FIG. 7, the joints between the arms of the intermediate frame assembly 120 and the header 200 (e.g., the ball and slider joints) are disposed along an axis extending through joints between arms of the header 200 and the header frame 214 (e.g., the arms coupled to the header frame 214 and to the cutter bar assembly 202). Additionally, the joints between the arms of the intermediate frame assembly 120 and the header 200 may be positioned at a central portion 242 (e.g., a central frame portion) of the header frame 214 that is between lateral portions 244 (e.g., lateral frame portions, a first lateral portion, a second lateral portion) of the header frame 214. The lateral portions 244 are configured to pivot (e.g., rotate) relative to the central portion 242. Additionally, the intermediate frame assembly 120 may enable the header 200 to rotate about the longitudinal axis 10 (e.g., rotation of the first lateral side 207, the second lateral side 209, and/or the central portion 242 about the longitudinal axis 10). As illustrated, the central portion 242 of the header frame 214 is positioned at a middle portion 246 of the header 200 that includes the longitudinal belt 210, and the lateral portions 244 are at the first lateral side 207 and the second lateral side 209 of the header 200. Because the joints between the arms of the intermediate frame assembly 120 and the header 200 are positioned along the axis, the first lateral belt 206, the second lateral belt 208, and the longitudinal belt 210 may have a generally consistent relationship relative to one another throughout a range of motion of the intermediate frame assembly 120 (e.g., throughout a range of motion of the arms and/or other portion(s) of the intermediate frame assembly 120 described herein). For example, the arms of the header 200 extending through the first lateral belt 206 and the second lateral belt 208 may pivot about the same axis as the arms of the intermediate frame assembly 120. Accordingly, as the header 200 moves vertically and/or laterally relative to the intermediate frame 230, the first lateral belt 206 and the second lateral belt 208 may generally maintain their positional relationships relative to the longitudinal belt 210. As such, harvesting certain types of crops, such as crops with relatively small stalk sizes, small grain sizes, other similar attributes, or a combination thereof, may be facilitated.

Figure 3:
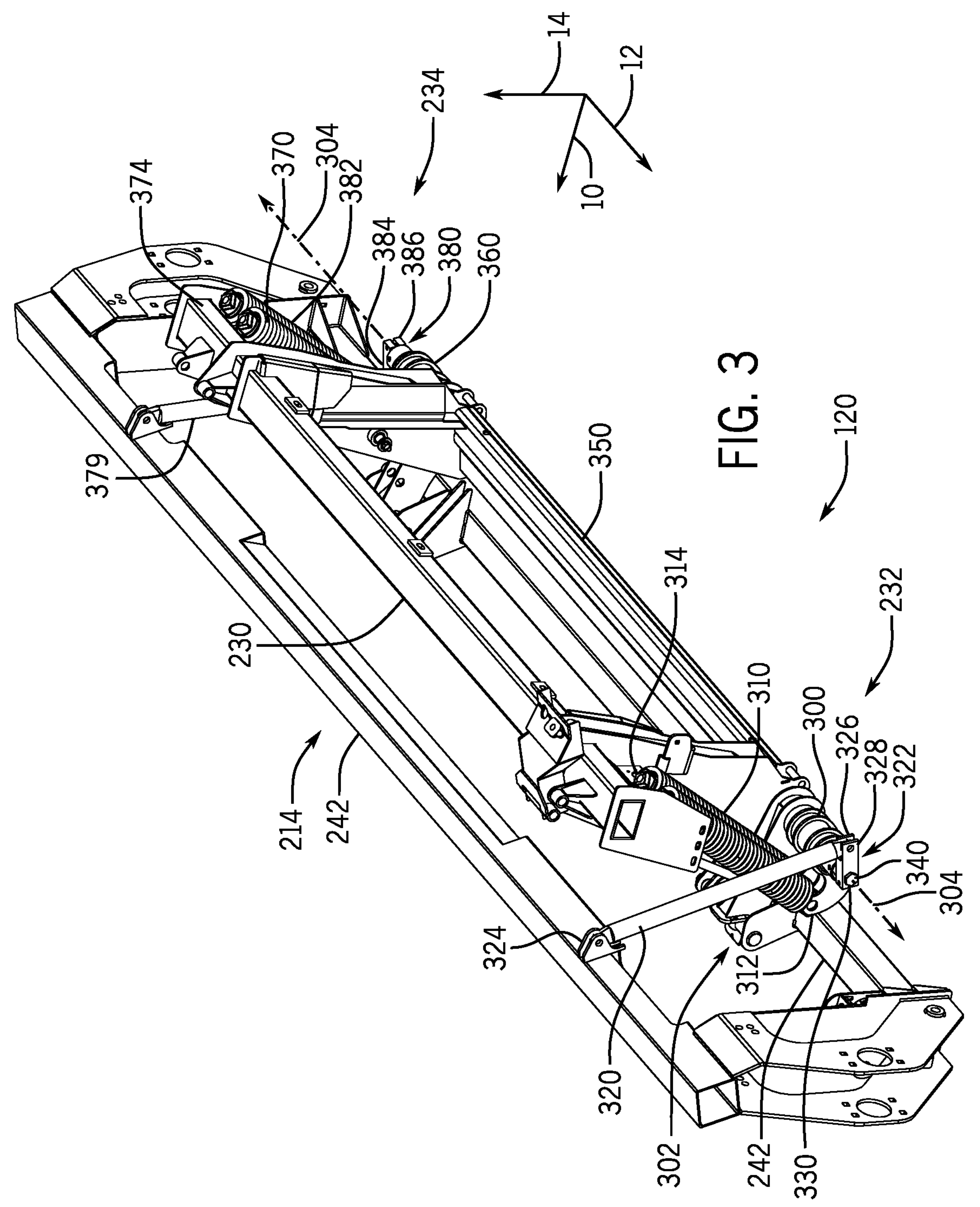
FIG. 3 is a rear perspective view of an embodiment of the intermediate frame assembly of FIG. 2, in accordance with an aspect of the present disclosure.

FIG. 3 is a rear perspective view of the intermediate frame assembly 120 of FIG. 2. As described above, the intermediate frame assembly 120 includes the first lateral side 232 and the second lateral side 234. At the first lateral side 232, the intermediate frame assembly 120 includes a first arm 300 (e.g., an intermediate arm) rotatably coupled to the header frame 214 of the header and rotatably coupled to the intermediate frame 230 of the intermediate frame assembly 120. In the illustrated embodiment, the first arm 300 is rotatably coupled to the header frame 214 at a first joint 302 (e.g., a ball and slider joint) that enables the first lateral side of the header to move vertically and/or laterally relative to the intermediate frame 230. For example, the first arm 300 is configured to rotate about a lateral axis 304 extending parallel to the intermediate frame 230. The lateral axis 304 may extend parallel to the lateral axis 12 described above. Additionally, the intermediate frame assembly 120 includes first springs 310 (e.g., biasing members) coupled to the first arm 300 at a first end 312 of the first springs 310 and to the intermediate frame 230 at a second end 314 of the first springs 310. As illustrated, the first springs 310 include two springs. In other embodiments, the first springs 310 may include more or fewer springs (e.g., one spring, three springs, four springs, six springs, ten springs). The first springs 310 are configured to flex (e.g., extend, contract) in response to movement of the first lateral side of the header and the corresponding rotation of the first arm 300. Accordingly, the first springs 310 may absorb energy associated with the movement of the first lateral side of the header relative to the intermediate frame 230 and may facilitate the cutter bar assembly following contours of the field. Additionally, the first springs 310 are configured to be tuned to adjust a torque on the first arm 300 (e.g., a tension and upward force of the first springs 310 applied to the first arm 300 may be adjusted). In certain embodiments, the intermediate frame assembly may include other biasing member(s) coupled (e.g., rotatably and/or pivotally coupled) to the first arm and the intermediate frame in addition to or in place of the first springs 310, such as a hydraulic cylinder, a pneumatic cylinder, and/or another suitable biasing member.

Additionally, the intermediate frame assembly 120 includes a first member 320 (e.g., a rigid bar) and a first linkage 322 at the first lateral side 232. The first member 320 is coupled (e.g., pivotally coupled) to the header frame 214 at a first end 324 of the first member 320 and coupled (e.g., pivotally coupled) to the first linkage 322 at a second end 326 of the first member 320. The first linkage 322 includes a first end 328 coupled (e.g., pivotally coupled) to the second end 326 of the first member 320 and a second end 330 coupled (e.g., rigidly coupled, non-rotatably coupled) to a cross-bar 340 (e.g., a rigid bar) of the intermediate frame assembly 120. The cross-bar 340 extends laterally along the intermediate frame 230. Additionally, the cross-bar 340 extends along a lateral extent of the frame 214 (e.g., along the lateral axis 12). As illustrated, the lateral axis 304 extends through the cross-bar 340, such that the first arm 300 is configured to rotate about the cross-bar 340. The cross-bar 340 extends through the first arm 300 and through a bottom portion 350 of the intermediate frame 230. For example, the bottom portion 350 may be hollow, such as a hollow cylinder, that enables the cross-bar 340 to rotate about the lateral axis 304.

At the second lateral side 234, the intermediate frame assembly 120 includes a second arm 360 (e.g., an intermediate arm) rotatably coupled to the header frame 214 of the header and rotatably coupled to the intermediate frame 230 of the intermediate frame assembly 120. In the illustrated embodiment, the second arm 360 is rotatably coupled to the header frame 214 at a second joint (e.g., a ball and slider joint) that enables the second lateral side of the header to move vertically and/or laterally relative to the intermediate frame 230. For example, the second arm 360 is configured to rotate about the lateral axis 304. Additionally, the intermediate frame assembly 120 includes second springs 370 (e.g., biasing members) coupled to the second arm 360 at a first end of the second springs 370 and to the intermediate frame 230 at a second end 374 of the second springs 370. As illustrated, the second springs 370 include two springs. In other embodiments, the second springs 370 may include more or fewer springs (e.g., one spring, three springs, four springs, six springs, ten springs). The second springs 370 are configured to flex (e.g., extend, contract) in response to movement of the second lateral side of the header and the corresponding rotation of the second arm 360. Accordingly, the second springs 370 may absorb energy associated with the movement of the second lateral side of the header relative to the intermediate frame 230 and may facilitate the cutter bar assembly following contours of the field. Additionally, the second springs 370 are configured to be tuned to adjust a torque on the second arm 360 (e.g., a tension and upward force of the second springs 370 applied to the second arm 360 may be adjusted). In certain embodiments, the intermediate frame assembly may include other biasing member(s) coupled (e.g., rotatably and/or pivotally coupled) to the first arm and the intermediate frame in addition to or in place of the second springs 370, such as a hydraulic cylinder, a pneumatic cylinder, and/or another suitable biasing member.

Additionally, the intermediate frame assembly 120 includes a second member 379 and a second linkage 380 at the second lateral side 234. The second member 379 is coupled (e.g., pivotally coupled) to the header frame 214 at a first end of the second member 379 and coupled (e.g., pivotally coupled) to the second linkage 380 at a second end 382 of the second member 379. The second linkage 380 includes a first end 384 coupled (e.g., pivotally coupled) to the second end of the second member and a second end 386 coupled (e.g., rigidly coupled, non-rotatably coupled) to the cross-bar 340. The cross-bar 340 extends through the second arm 360.

In certain embodiments, the first member and/or the second member may be adjustable. For example, the first member and/or the second member may be a hydraulically adjustable member or an electrically adjustable member. The adjustable members may facilitate changing an orientation of the header about the lateral axis, thereby facilitating changes and/or adjustment to the height of the cutter bar assembly relative to a terrain surface.

As described in greater detail below in reference to FIGS. 4A and 4B, rotation of the cross-bar 340 drives rotation of the first linkage 322 and the second linkage 380. For example, movement of the first lateral side of the header drives movement of the first member 320, which drives rotation of the first linkage 322. The rotation of the first linkage 322 drives rotation of the cross-bar 340, which drives rotation of the second linkage 380. In the illustrated embodiment, rotation of the first linkage 322 causes the cross-bar 340 to rotate, thereby rotating the second linkage 380 in a rotational direction. Rotation of the second linkage 380 drives movement of the second member 379 at the second lateral side 234, thereby driving movement of the second lateral side of the header in an opposite direction relative to the first lateral side of the header. Movement of the second lateral side of the header in the opposite direction relative to the first lateral side of the header drives movement of the second arm 360 in a rotational direction opposite the rotational direction of the first arm 300, and the second springs 370 are configured to flex (e.g., extend, contract) in response to the movement of the second lateral side of the header. As illustrated and described in reference to FIG. 5, the ball and slider configuration of the first joint 302 and the second joint facilitates relative movement of the first and second lateral sides of the header as the first linkage 322, the cross-bar 340, and the second linkage 380 rotate, such as by enabling balls mounted to the header frame 214 to slide (e.g., laterally) within the first arm 300 and the second arm 360 at the first joint 302 and the second joint, respectively.

In certain embodiments, the downward movement of the second lateral side of the header may be relative to the first lateral side of the header. For example, both the first lateral side of the header and the second lateral side of the header may move upwardly relative to a ground surface. The first lateral side of the header may move upwardly more than the second lateral side of the header, such that the second lateral side moves downwardly relative to the first lateral side.

Figures 4A, 4B:
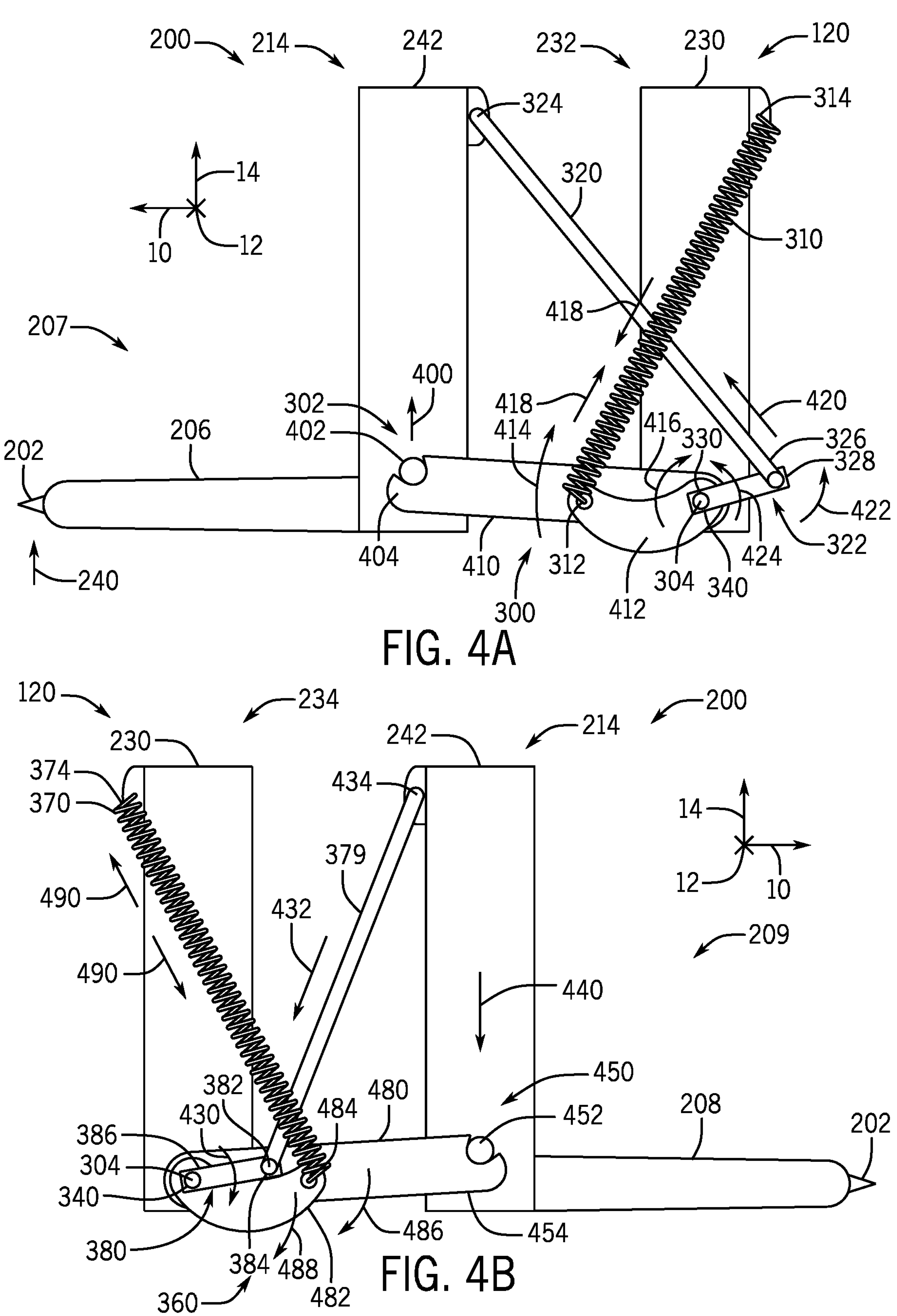
FIG. 4A is a schematic view of an embodiment of a first lateral side of the intermediate frame assembly of FIG. 2, in accordance with an aspect of the present disclosure.
FIG. 4B is a schematic view of an embodiment of a second lateral side of the intermediate frame assembly of FIG. 2, in accordance with an aspect of the present disclosure.

FIG. 4A is a schematic view of the first lateral side 232 of the intermediate frame assembly 120. FIG. 4B is a schematic view of the second lateral side 234 of the intermediate frame assembly 120. FIGS. 4A and 4B depict potential movement of the header 200, the first lateral side 232, and the second lateral side 234 relative to one another. To facilitate description, FIGS. 4A and 4B are described in reference to the first lateral side 207 of the header 200 rising upwardly, as indicated by the arrow 240, which may be caused by the first lateral side 207 encountering an obstacle (e.g., a rock, a dirt mound, etc.) and/or traversing uneven terrain (e.g., a hill, etc.) that pushes the first lateral side 207 upwardly. While the arrow 240 is shown to be adjacent to the cutter bar assembly 202 along the longitudinal axis 10, in other embodiments, other portion(s) of the header may encounter an obstacle that moves the portion(s) of the header vertically, such as wheels coupled to the frame. In a substantially rigid configuration of the cutter bar assembly 202, upward movement of the cutter bar assembly 202, as indicated by the arrow 240, may cause an arm rigidly coupled to the cutter bar assembly 202 and rigidly (e.g., substantially rigidly) coupled to the header frame 214 to drive the header frame 214 upwardly, as indicated by arrow 400. In a flexible configuration of the cutter bar assembly 202, upward movement of a wheel or another portion of the header that is rigidly coupled to the header frame 214 along the vertical axis 14 may also drive the header frame 214 upwardly, as indicated by arrow 400. In addition, in the flexible configuration of the cutter bar assembly 202, the upward movement of the cutter bar assembly 202, as indicated by the arrow 240, may cause the upward movement of the header frame 214 indicated by arrow 400. For example, a header arm of the header that is coupled to the cutter bar assembly 202 may rotate upwardly to enable the flexible configuration and may contact a stop that blocks further rotation of the header arm (e.g., a stop of the header). Blocking the further rotation of the header arm may drive the upward movement of the header frame 214 indicated by arrow 400.

The upward movement of the header frame 214 causes upward movement of the first joint 302. In the illustrated embodiment, a ball 402 is coupled to the header frame 214 (e.g., a ball rigidly mounted/coupled to the central portion of the header frame 214), and the ball 402 is disposed within a sleeve 404 of the first arm 300 to form the first joint 302. The ball 402 is configured to remain in the sleeve 404 and to slide and/or rotate in the sleeve 404. In certain embodiments and as described in greater detail below, the ball may be coupled (e.g., rigidly coupled) to the sleeve and slide along a pin coupled (e.g., rigidly coupled) to the header frame.

As illustrated, the first arm 300 includes a first longitudinal portion 410 (e.g., a first arm portion) and a second longitudinal portion 412 (e.g., a second arm portion). The first longitudinal portion 410 includes the sleeve 404. The second longitudinal portion 412 is rigidly coupled to the first longitudinal portion 410 and is pivotally coupled to the first end 312 of the first springs 310. The upward movement of the first joint 302 drives the first longitudinal portion 410, along with the first arm 300 generally, to rotate about the lateral axis 304, as indicated by arrow 414. As such, the second longitudinal portion 412 also rotates, as indicated by arrow 416. Rotation of the second longitudinal portion 412 causes the first springs 310 to flex (e.g., contract), as indicated by arrows 418. Accordingly, the first springs 310 may absorb energy associated with the movement of the first lateral side 207 of the header relative to the intermediate frame 230 and may facilitate the cutter bar assembly 202 following contours of the field.

Additionally, the upward movement of the header frame 214 drives the first member 320 to move generally upwardly (e.g., along the vertical axis 14), as indicated by arrow 420. The movement of the first member 320 drives the first linkage 322 to rotate, as indicated by arrow 422. As described above, the first linkage 322 is rigidly coupled to the cross-bar 340, such that rotation of the first linkage 322 drives rotation of the cross-bar 340, as indicated by arrow 424.

Turning to the second lateral side 209 of the header 200 and the second lateral side 234 of the intermediate frame assembly 120, rotation of the cross-bar 340 about the lateral axis 304 drives rotation of the second linkage 380, as indicated by arrow 430. Additionally, rotation of the second linkage 380 drives the second member 379 generally downwardly (e.g., along the vertical axis 14), as indicated by arrow 432. For example, the second linkage 380 may move the second end 382 of the second member 379. A first end 434 of the second member 379 is coupled (e.g., pivotally coupled) to the header frame 214 of the header 200. Accordingly, the second member 379 drives the header frame 214 generally downwardly, as indicated by arrow 440, in response to rotation of the second linkage 380.

In certain embodiments, the second lateral side 209 of the header 200 may move upwardly with the first lateral side 207 of the header 200. For example, the second lateral side 209 may move upwardly to a lesser degree relative to the first lateral side 207. More specifically, the cross-bar 340 may drive rotation of the second linkage 380 and downward movement of the second member 379, but the second lateral side 209 of the header 200 may move upwardly relative to a terrain surface. Both the first lateral side 207 and the second lateral side 209 of the header 200 may remain in contact with the terrain surface (e.g., wheels of the header 200 are in contact with the terrain surface, the cutter bar assembly 202 of the header 200 is in contact with the terrain surface, etc.) during the upward movement the first lateral side 207 of the header 200 and the upward movement or downward movement of the second lateral side 209 of the header 200. As such, the header 200 may tilt (e.g., rotate about the longitudinal axis 10) while the second lateral side 209 of the header 200 moves downwardly or upwardly relative to the terrain surface and while the header 200 traverses the terrain surface. Accordingly, the intermediate frame assembly 120 may isolate tilting (e.g., rotation) of the header relative to the agricultural harvester and the implement interface described in reference to FIG. 1.

The second arm 360 of the intermediate frame assembly 120 is rotatably and slidably coupled to the header frame 214 at a second joint 450 (e.g., a ball and slider joint). In the illustrated embodiment, a ball 452 is coupled to the header frame 214 (e.g., a ball rigidly mounted/coupled to the central portion of the header frame 214), and the ball 452 is disposed within a sleeve 454 of the second arm 360 to form the second joint 450. The ball 452 is configured to remain in the sleeve 454 and to slide and/or rotate in the sleeve 454. Additionally, as described above, the first joint 302 is formed by (e.g., includes) the ball 402, which is coupled to the header frame 214, and the sleeve 404 of the first arm 300. As the first lateral side 207 of the header 200 rises upwardly, as indicated by arrow 240, the header frame 214 of the header 200 also moves upwardly at the first lateral side 207. Additionally, the second lateral side 209 of the header 200 is driven downwardly via rotation of the first linkage 322, the cross-bar 340, and the second linkage 380. As the header frame 214 moves vertically (e.g., upwardly and/or downwardly) at the first lateral side 207 and/or at the second lateral side 209, the balls 402 and 452 may rotate within the sleeves 404 and 454, respectively, to accommodate the movement of the header frame 214.

In certain embodiments, the ball 402 may be coupled (e.g., rigidly coupled) to the sleeve 404 and slide along a pin coupled (e.g., rigidly coupled) to the header frame 214. Additionally, the ball 452 may be coupled (e.g., rigidly coupled) to the sleeve 454 and slide along a pin coupled (e.g., rigidly coupled) to the header frame 214. As the first lateral side 207 and/or the second lateral side 209 of the header 200 moves upwardly and/or downwardly, the ball 402 and/or the ball 452 may slide along the respective pins coupled to the header frame 214, thereby accommodating movement of the header frame 216 relative to the intermediate frame 230.

As illustrated, the second arm 360 includes a first longitudinal portion 480 and a second longitudinal portion 482. The first longitudinal portion 480 includes the sleeve 454. The second longitudinal portion 482 is rigidly coupled to the first longitudinal portion 480 and is pivotally coupled to a first end 484 of the second springs 370. The downward movement of the second joint 450 may drive the first longitudinal portion 480, along with the second arm 360 generally, to rotate about the lateral axis 304, as indicated by arrow 486. As such, the second longitudinal portion 482 may also rotate, as indicated by arrow 488. Rotation of the second longitudinal portion 482 causes the second springs 370 to flex (e.g., extend), as indicated by arrows 490. Accordingly, the second springs 370 may absorb energy associated with the movement of the second lateral side 209 of the header relative to the intermediate frame 230 and may facilitate the cutter bar assembly 202 following contours of the field.

As illustrated, the first linkage 322 and the second linkage 380 extend in generally opposite directions (e.g., longitudinal directions, along the longitudinal axis 10) from the respective member. This configuration of the first linkage 322 and the second linkage 380, along with the coupling of the first linkage 322 and the second linkage 380 to the cross-bar 340, enables the relative vertical movement of the first lateral side 207 and the second lateral side 209 of the header 200. For example, as described above, rotation of the first linkage 322, as indicated by the arrow 422, drives rotation of the second linkage 380 in the rotational direction indicated by the arrow 430. Accordingly, the first linkage 322 and the second linkage 380 are configured to rotate in the same rotational direction.

Figures 5, 6:
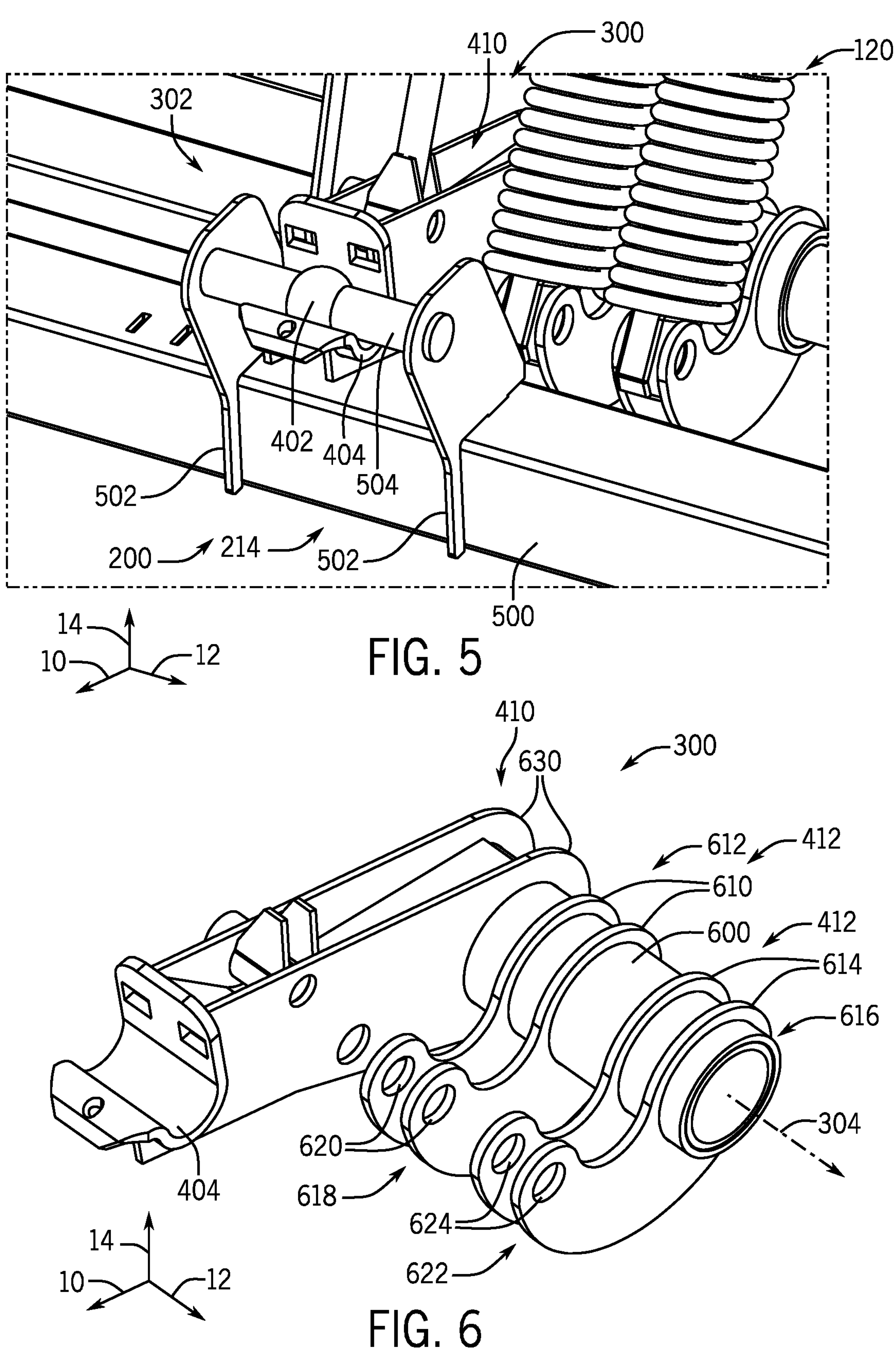
FIG. 5 is a perspective view of an embodiment of a joint between the intermediate frame assembly of FIG. 2 and a header frame of the header of FIG. 2, in accordance with an aspect of the present disclosure.
FIG. 6 is a perspective view of an embodiment of an arm of the intermediate frame assembly of FIG. 2, in accordance with an aspect of the present disclosure.

FIG. 5 is a perspective view of the first joint 302 between the intermediate frame assembly 120 and the header frame 214 of the header 200. As illustrated, the first joint 302 is formed by (e.g., includes) the ball 402 and the sleeve 404 of the first arm 300. The ball 402 is configured to remain in the sleeve 404 and to slide and rotate in the sleeve 404. The header frame 214 includes a bottom member 500, and brackets 502 are coupled (e.g., rigidly coupled) to and extending from the bottom member 500. Additionally, a bar 504 (e.g., a pin) is coupled (e.g., rigidly coupled) to the brackets 502 and to the ball 402. Accordingly, the ball 402 is rigidly coupled to the bottom member 500 of the header frame 214. As described above, in certain embodiments, the ball 402 may be rigidly coupled to the sleeve 404, and the ball 402 may slide along the bar 504.

The first longitudinal portion 410 of the first arm 300 includes the sleeve 404. The sleeve 404 is configured to retain the ball 402, such that the ball 402 and the sleeve 404 may rotate and slide relative to one another. For example, the ball 402 and the sleeve 404 may rotate about the lateral axis 12 relative to one another. Additionally, the ball 402 and the sleeve 404 may slide along the lateral axis 12 relative to one another.

The second joint between the intermediate frame assembly and the header frame of the header may include a ball and slider joint similar to the illustrated first joint 302. For example, at the second joint, the ball, which is coupled to the frame, and the sleeve of the second arm of the intermediate frame assembly may be configured to rotate and slide relative to one another. Accordingly, the first and second joints enable relative movement of the first and second lateral sides of the header as the first linkage, the cross-bar, the second linkage, or a combination thereof, of the intermediate frame assembly rotate.

FIG. 6 is a perspective view of the first arm 300 of the intermediate frame assembly. The first arm 300 includes the first longitudinal portion 410, the second longitudinal portion 412, and a lateral portion 600 (e.g., a third arm portion). As described above, the first longitudinal portion 410 is configured to couple (e.g., rotatably and slidably couple) to the frame (e.g., via the ball coupled to the frame) of the header at the first lateral side of the header. Additionally, the second longitudinal portion 412 is configured to couple (e.g., pivotally couple) to the first springs of the intermediate frame assembly.

The lateral portion 600 is rigidly coupled to the first longitudinal portion 410 and to the second longitudinal portion 412. Additionally, the lateral portion 600 is generally hollow, such that the cross-bar of the intermediate frame assembly may extend within and/or through the lateral portion 600 and rotate freely within the lateral portion 600. For example, the lateral portion 600 may include a tube or other suitable cylindrical structure that enables the cross-bar to rotate freely. In certain embodiments, bearing(s) may be disposed between the lateral portion and the cross-bar to facilitate rotation of the cross-bar within the lateral portion. The lateral portion 600 may extend generally along the lateral axis 304 and/or along a lateral extent of the intermediate frame of the intermediate frame assembly.

As illustrated, the second longitudinal portion 412 includes a first pair of extensions 610 coupled (e.g., rigidly coupled) to the lateral portion 600 at a first end 612 of the first pair of extensions 610. The second longitudinal portion 412 also includes a second pair of extensions 614 coupled (e.g., rigidly coupled) to the lateral portion 600 at a first end 616 of the second pair of extensions 614. Each of the first pair of extensions 610 and the second pair of extensions 614 is configured to couple (e.g., pivotally couple) to a respective spring of the first springs of the intermediate frame assembly. For example, a second end 618 of the first pair of extensions 610 may couple to the first end of a respective spring of the first springs. The first end of the respective spring may extend between the first pair of extensions 610 at the second end 618 of the first pair of extensions 610. At the second end 618, the first pair of extensions 610 includes holes 620 to enable the end of the respective spring to be coupled (e.g., pivotally coupled) to the first pair of extensions 610 (e.g., a fastener may extend through the first end of the respective spring and the holes 620). Likewise, a second end 622 of the second pair of extensions 614 may couple to the first end of an additional respective spring of the first springs. The first end of the additional respective spring may extend between the second pair of extensions 614 at the second end 622. At the second end 622, the second pair of extensions 614 includes holes 624 to enable the first end of the additional respective spring to be coupled (e.g., pivotally coupled) to the second pair of extensions 614 (e.g., a fastener may extend through the end of the additional respective spring and the holes 624). The first longitudinal portion 410 of the first arm 300 includes brackets 630 coupled (e.g., rigidly coupled) to the lateral portion 600. The brackets 630 are also coupled (e.g., rigidly coupled) to the sleeve 404.

In the illustrated embodiment, the first arm 300 is configured to couple to two springs of the first springs of the intermediate frame assembly. As described above, the intermediate frame assembly may include more or fewer first springs (e.g., one spring, three springs, four springs, six springs, ten springs). As such, the first arm may include more or fewer pairs of extensions configured to couple to the first springs (e.g., one pair of extensions, three pairs of extensions, four pairs of extensions, six pairs of extensions, ten pairs of extensions). In certain embodiments, the pairs of extensions of the first arm may be greater than the number of first springs of the intermediate frame assembly, such that one or more pairs of extensions are not coupled to respective spring(s) of the first springs (e.g., one or more pairs of extensions may not be in use). In certain embodiments, the first arm may include one extension (e.g., instead of a pair of extensions) configured to couple to a spring of the first springs. In certain embodiments, the first arm may include multiple extensions with each extension configured to couple to a respective spring of the first springs.

In certain embodiments, the first longitudinal portion, the second longitudinal portion, and the lateral portion of the second arm may be similar to the first longitudinal portion 410, the second longitudinal portion 412, and the lateral portion 600, respectively, of the first arm 300. For example, the first longitudinal portion of the second arm may include brackets rigidly coupled to the lateral portion and the sleeve of the second arm. Additionally, the second longitudinal portion of the second arm may include pairs of extensions configured to pivotally coupled to the second springs of the intermediate frame assembly. Further, any of the variations of the first arm 300 described herein may apply to the second arm.

Figure 7:
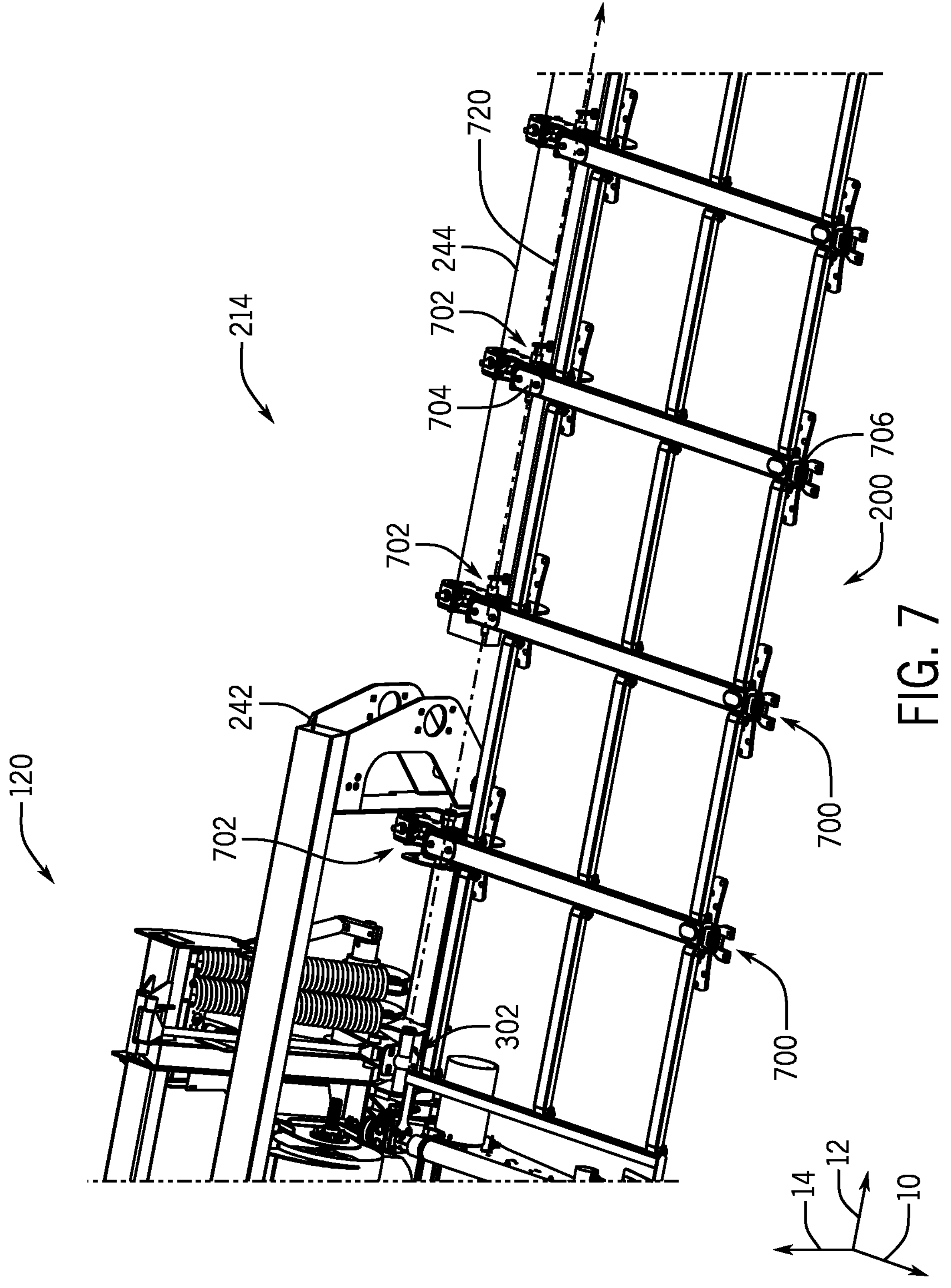
FIG. 7 is a perspective view of an embodiment of a portion of the intermediate frame assembly of FIG. 2 and arms of the header of FIG. 2, in accordance with an aspect of the present disclosure.

FIG. 7 is a perspective view of a portion of the intermediate frame assembly 120 and header arms 700 of the header 200. The header arms 700 are pivotally coupled to the header frame 214 of the header 200 at pivot joints 702. As described above in reference to FIG. 2, the header frame 214 includes the central portion 242 and the lateral portions 244. For clarity purposes, only one lateral portion 244 is shown, and portions of the lateral portion 244 of the header frame 214, as well as the header 200 generally, are omitted in FIG. 7. The header arms 700 may extend through the lateral belts of the header 200. Agricultural crops that contact the top surface of the lateral belts are driven laterally inwardly to the longitudinal belt of the header 200 due to the movement of the lateral belts. In addition, agricultural crops that contact the longitudinal belt and the agricultural crops provided to the longitudinal belt by the lateral belts are driven rearwardly along the longitudinal axis 10 due to the movement of the longitudinal belt. Accordingly, the lateral belts and the longitudinal belt move the cut agricultural crops through the opening in the header 200 to the inlet of the agricultural crop processing system.

The pivot joints 702 are formed between the header arms 700 and the central portion 242 and between the header arms 700 and the lateral portion 244. The header arms 700 include first ends 704 pivotally coupled to the header frame 214 at the central portion 242 and at the lateral portion 244 (e.g., at the pivot joints 702), and the header arms 700 include second ends 706 configured to couple to the cutter bar assembly of the header 200. At the pivot joints 702, the header arms 700 may be configured to pivot (e.g., rotate) to enable the cutter bar assembly to flex. If a substantially rigid cutter bar assembly is desired, rotation of the header arms 700 at the pivot joints 702 may be blocked, such as by inserting pins through the header arms 700 and the header frame 214 and/or by other suitable blocking mechanism(s).

As illustrated, the first joint 302 is between the first arm 300 of the intermediate frame assembly 120 and the central portion 242 of the header frame 214. As described above, the central portion 242 is at the middle portion of the header 200, which includes the longitudinal belt, and the lateral portion 244 of the header frame 214 is at the first lateral side 207 of the header 200, which partially includes one of the lateral belts. Additionally, the first joint 302 is disposed along an axis 720 that intersects the pivot joints 702 (e.g., the axis 720 intersects the first joint 302, the pivot joints 702, and the second joint between the second arm of the intermediate frame assembly 120 and the header frame 214). For example, the first arm and the second arm of the intermediate frame assembly 120 and the header arms 700 are configured to pivot about the axis 720. Additionally, the first arm and the second arm of the intermediate frame assembly 120 extend in a generally opposite direction (e.g., longitudinal direction, along the longitudinal axis 10) from the axis 720 relative to the header arms 700. The axis 720 extends generally parallel to the lateral axis 12.

The configuration of the axis 720 intersecting the first joint 302, the pivot joints 702, and the second joint between the second arm of the intermediate frame assembly 120 and the header frame 214 enables the lateral belts and the longitudinal belt of the header 200 to have a generally consistent relationship relative to one another throughout a range of motion of the intermediate frame assembly 120 (e.g., throughout a range of motion of the arms and/or other portion(s) of the intermediate frame assembly 120 described herein). For example, the header arms 700 may pivot about the same axis as the first arm 300 and the second arm of the intermediate frame assembly 120. Accordingly, as the header 200 moves vertically and/or laterally relative to the frame of the intermediate frame assembly 120, the lateral belts of the header 200 may generally maintain their positional relationships relative to the longitudinal belt of the header 200. As such, harvesting certain types of crops, such as crops with relatively small stalk sizes, small grain sizes, other similar attributes, or a combination thereof, may be facilitated. For example, the configuration of the axis 720 intersecting the first joint 302, the pivot joints 702, and the second joint between the second arm of the intermediate frame assembly 120 and the header frame 214 may reduce gaps between the lateral belts and the longitudinal belt, thereby facilitating transition of the relatively small stalks and/or grains from the lateral belts to the longitudinal belt.

The intermediate frame assembly described herein is configured to enable sides of an agricultural header to move vertically relative to one another. For example, a first lateral side of the header may encounter an obstacle (e.g., a dirt mound, a hill, a rock, crop stubble, crop residue, a hole, etc.), which may drive the first lateral side vertically (e.g., upwardly or downwardly). The intermediate frame assembly is configured to enable the first lateral side to move vertically relative to a second, opposite lateral side of the header.

For example, at a first lateral side of the intermediate frame assembly, the intermediate frame assembly may include a first arm rotatably and/or pivotally coupled to an intermediate frame of the intermediate frame assembly and a header frame of the header, first springs rotatably and/or pivotally coupled to the first arm and the intermediate frame, a first member rotatably and/or pivotally coupled to the first arm and the header frame, a cross-bar extending through the intermediate frame, and a first linkage rotatably and/or pivotally coupled to the first member and rigidly coupled to the cross-bar. At a second lateral side of the intermediate frame assembly, the intermediate frame assembly may include a second arm rotatably and/or pivotally coupled to the intermediate frame and the header frame, second springs rotatably and/or pivotally coupled to the second arm and the intermediate frame, a second member rotatably and/or pivotally coupled to the second arm and the header frame, a cross-bar extending through the intermediate frame, and a second linkage rotatably and/or pivotally coupled to the second member and rigidly coupled to the cross-bar. The first and second linkages may extend in generally opposite longitudinal directions. Vertical movement of the first lateral side of the header may drive rotation of the first arm and may cause the first springs to flex (e.g., contract). Additionally, the vertical movement of the first lateral side of the header may drive the first member upwardly, which may drive rotation of the first linkage. Rotation of the first linkage may drive rotation of the cross-bar. Rotation of the cross-bar may drive rotation of the second linkage, which may drive the second member downwardly. The downward movement of the second member may drive the second lateral side of the header downwardly. The downward movement of the second lateral side of the header may drive rotation of the second arm, which may cause the second springs to flex (e.g., extend). As such, the cross-bar and the first and second linkages may enable the first lateral side of the header to move vertically relative to the second lateral side of the header, or vice versa. In particular, the intermediate frame assembly may enable the header to rotate (e.g., tilt) about a longitudinal axis (e.g., rotation of the first lateral side of the header, the second lateral side of the header, and/or a central frame portion of the header positioned between the first lateral side and the second lateral side about the longitudinal axis). Accordingly, the intermediate frame assembly may generally isolate rotation of the header from the agricultural harvester (e.g., the implement interface of the agricultural harvester).

In certain embodiments, the intermediate frame assembly and the header may be coupled via ball and slider joints (e.g., ball and slider joints between the header frame and the first and second arms of the intermediate frame assembly) that enable the relative movement of the sides of the header. Accordingly, the intermediate frame assembly may facilitate each of the lateral sides of the header, as well as portion(s) of the header between the lateral sides, to follow the contour of terrain encountered by the header. Additionally, the ball and slider joints may be disposed along a lateral axis that intersects additional joints between header arms and a header frame of the header, which may facilitate harvesting certain types of crops, such as crops with relatively small stalk sizes, small grain sizes, other similar attributes, or a combination thereof.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A frame assembly for an agricultural header, comprising:

an intermediate frame;

one or more arms directly pivotally coupled to the intermediate frame, wherein each arm of the one or more arms is configured to couple to a frame of the agricultural header at a respective joint and rotate relative to the frame of the agricultural header at the respective joint, wherein each respective joint is disposed on an axis extending through one or more pivot joints of the agricultural header, the one or more pivot joints pivotally couple one or more header arms to the frame of the agricultural header, and the one or more header arms are configured to support a cutter bar of the agricultural header; and one or more springs coupled to the intermediate frame, wherein each spring of the one or more springs is coupled to a respective arm of the one or more arms, and the one or more springs are configured to flex to enable movement of the frame of the agricultural header relative to the intermediate frame.

2. The frame assembly of claim 1, wherein each arm of the one or more arms comprises:

a first arm portion configured to couple to the frame of the agricultural header at the respective joint; and a second arm portion coupled to at least one spring of the one or more springs.

3. The frame assembly of claim 2, wherein the first arm portion is configured to enable the frame of the agricultural header to move laterally relative to the intermediate frame at the respective joint.

4. The frame assembly of claim 2, wherein the first arm portion and the second arm portion extend longitudinally along the frame assembly, and each arm of the one or more arms comprises a third arm portion coupled to the first arm portion and to the second arm portion and extending laterally along the frame assembly.

5. The frame assembly of claim 1, wherein the one or more arms comprise:

a first arm configured to rotate in a first rotational direction relative to the intermediate frame; and a second arm configured to rotate in a second rotational direction relative to the intermediate frame, wherein the first rotational direction is opposite the second rotational direction to enable the agricultural header to rotate about a longitudinal axis.

6. The frame assembly of claim 1, wherein the axis extends parallel to the frame of the agricultural header and to the cutter bar of the agricultural header.

7. The frame assembly of claim 1, comprising:

a first member disposed at a first side of the intermediate frame and configured to couple to the agricultural header;

a first linkage pivotally coupled to the first member;

a second member disposed at a second side of the intermediate frame and configured to couple to the agricultural header, wherein the first side of the intermediate frame is disposed laterally opposite the second side;

a second linkage pivotally coupled to the second member; and a cross-bar non-rotatably coupled to the first linkage and to the second linkage, wherein the first linkage extends in an opposite longitudinal direction from the cross-bar relative to the second linkage.

8. The frame assembly of claim 7, wherein the first member, the first linkage, the second member, and the second linkage are configured to enable the agricultural header to rotate about a longitudinal axis via rotation of the cross-bar, the first linkage, and the second linkage.

9. An agricultural implement assembly, comprising:

an agricultural header comprising:

a header frame;

a cutter bar; and one or more header arms pivotally coupled to the header frame at one or more respective pivot joints and coupled to the cutter bar, wherein an axis extends through the one or more respective pivot joints; and an intermediate frame assembly comprising:

an intermediate frame;

one or more intermediate arms coupled to the header frame at one or more respective intermediate joints and directly pivotally coupled to the intermediate frame, wherein the one or more intermediate arms are configured to rotate relative to the header frame at the one or more respective intermediate joints, and each respective intermediate joint of the one or more respective intermediate joints is disposed on the axis; and one or more springs coupled to the intermediate frame, wherein each spring of the one or more springs is coupled to a respective intermediate arm of the one or more intermediate arms, and the one or more springs are configured to flex to enable movement of the header frame relative to the intermediate frame.

10. The agricultural implement assembly of claim 9, wherein each intermediate arm of the one or more intermediate arms comprises:

a first arm portion coupled to the header frame at a respective intermediate joint of the one or more respective intermediate joints; and a second arm portion coupled to at least one spring of the one or more springs.

11. The agricultural implement assembly of claim 10, wherein the first arm portion is configured to enable the header frame to move laterally relative to the intermediate frame at the one or more respective intermediate joints.

12. The agricultural implement assembly of claim 9, wherein the header frame comprises a central frame portion and one or more lateral frame portions disposed laterally adjacent to the central frame portion, and the one or more lateral frame portions are configured to pivot relative to the central frame portion.

13. The agricultural implement assembly of claim 12, wherein the one or more header arms are rotatably coupled to the one or more lateral frame portions, and the one or more intermediate arms are coupled to the central frame portion.

14. The agricultural implement assembly of claim 9, wherein the one or more respective pivot joints are configured to enable the cutter bar to flex via rotation of the one or more header arms relative to the header frame.

15. The agricultural implement assembly of claim 9, wherein the axis extends along a lateral extent of the agricultural implement assembly, and the one or more header arms and the one or more intermediate arms extend longitudinally from the axis in opposite longitudinal directions.

16. The agricultural implement assembly of claim 9, wherein each intermediate joint of the one or more respective intermediate joints comprises:

a ball;

a bar extending through the ball and coupled to the header frame; and one or more brackets coupled to the bar and a frame member of the header frame, wherein each respective intermediate arm of the one or more intermediate arms is configured to rotate about the ball to enable the movement of the header frame relative to the intermediate frame.

17. An agricultural implement assembly, comprising:

an agricultural header frame configured to pivotally couple to one or more header arms at one or more pivot joints, wherein the one or more header arms are configured to support a cutter bar, and an axis extends through the one or more pivot joints; and an intermediate frame assembly comprising:

an intermediate frame;

one or more intermediate arms coupled to the agricultural header frame at one or more respective intermediate joints and directly pivotally coupled to the intermediate frame, wherein the one or more intermediate arms are configured to rotate relative to the agricultural header frame at the one or more respective intermediate joints, and each respective intermediate joint of the one or more respective intermediate joints is disposed on the axis; and one or more springs coupled to the intermediate frame and the one or more intermediate arms, wherein the one or more springs are configured to flex to enable movement of the agricultural header frame relative to the intermediate frame.

18. The agricultural implement assembly of claim 17, wherein the agricultural header frame is configured to move laterally relative to the one or more intermediate arms at the one or more respective intermediate joints.

19. The agricultural implement assembly of claim 17, wherein the agricultural header frame comprises a central frame portion and one or more lateral frame portions disposed laterally adjacent to the central frame portion, and the one or more lateral frame portions are configured to pivot relative to the central frame portion.

20. The agricultural implement assembly of claim 19, wherein the one or more lateral frame portions are configured to pivotally couple to the one or more header arms, and the one or more intermediate arms are coupled to the central frame portion.

* * * * *